United States Patent [19]

Pritsch

[11] Patent Number: 6,092,103
[45] Date of Patent: Jul. 18, 2000

[54] TRANSMISSION UNIT RECEIVING AND STORING MEANS

[75] Inventor: Elmar Pritsch, Aachen, Germany

[73] Assignee: Telefonaktiebolaget LM Ericsson, Stockholm, Sweden

[21] Appl. No.: 09/114,349

[22] Filed: Jul. 13, 1998

[30] Foreign Application Priority Data

Jul. 14, 1997 [DE] Germany ............................ 197 30 112

[51] Int. Cl.$^7$ .............................. G06F 13/38; G06F 15/17
[52] U.S. Cl. ....................... 709/206; 709/241; 379/93.24; 370/392
[58] Field of Search ..................................... 709/206, 207, 709/236, 240, 241; 379/93.01, 93.24, 100.08; 370/392

[56] References Cited

U.S. PATENT DOCUMENTS

| | | | |
|---|---|---|---|
| 5,530,852 | 6/1996 | Meske, Jr. et al. ...................... | 709/206 |
| 5,548,506 | 8/1996 | Srinivasan ................................ | 709/206 |
| 5,613,108 | 3/1997 | Morikawa . | |
| 5,826,023 | 10/1998 | Hall et al. ................................ | 709/206 |
| 5,864,684 | 1/1999 | Nielsen .................................... | 709/206 |
| 5,937,161 | 8/1999 | Mulligan et al. ..................... | 379/93.24 |
| 5,944,787 | 8/1999 | Zoken ..................................... | 709/206 |
| 5,974,488 | 10/1999 | Dobbins et al. . | |

FOREIGN PATENT DOCUMENTS

| | | |
|---|---|---|
| 0420779A2 | 4/1991 | European Pat. Off. . |
| 0420779A3 | 4/1991 | European Pat. Off. . |

OTHER PUBLICATIONS

IEEF Transactions on Knowledge and Data Engineering, vol. 9, No. 2, Mar.–Apr. 1997, XP–002080858, Concise Papers, "Experience with Rule Induction and k–Nearest Neighbor Methods for Interface Agents that Learn", Terry R. Payne, et al.

Machine Learning in Information Access Papers from the 1996 AAAI Spring Symposium, XP–002081149, "Learning Rules that Classify E–Mail", William W. Cohen (AT&T Laboratories).

David H. Crocker, RFC #822, "Standard For The Format Of ARPA Internet Text Messages", Aug. 13, 1982, Univ. of Delaware, Newark, DE.

N. Borestein et al., RFC 1521, MIME "(Multipurpose Internet Mail Extensions) Part One: Mechanisms for Specifying and Describing the Format of Internet Message Bodies", Sep. 1993.

K. Moore, RFC 1522, MIME "(Multipurpose Internet Mail Extensions) Part Two: Message Header Extensions for Non–ASCII Text", Univ. of TN, Sep. 1993.

Johanthan B. Postel, RFC 821, "Simple Mail Transfer Protocol", Aug. 1982, Univ. of So. CA, Marina del Rey, CA.

ITU–T Recommendation F.400/X.400, "Message handling system and service overview", (Jul. 1996).

ITU–T Recommendation X.402, "Information Technology—Message Handling Systems (MHS): Overall Architecture" (Nov. 1995).

ITU–T Recommendation X.408, "Message Handling Systems: Encoded Information Type Conversion Rules" (1988).

(List continued on next page.)

Primary Examiner—Mark H. Rinehart
Attorney, Agent, or Firm—Burns, Doane, Swecker & Mathis, L.L.P.

[57] ABSTRACT

A system and method for receiving and storing information transmission units such as electronic mails, where newly received transmission units are automatically allocated to groups in a storing means, employing a weighted sum with respect to the determination of allocation decision parameters from the comparison between the structure of previously stored transmission units and the newly to be stored transmission units.

26 Claims, 5 Drawing Sheets

| | OCCURENCE VALUE FOR GROUP 1 | | WEIGHT FACTOR FOR GROUP 1 | |
|---|---|---|---|---|
| AUTHOR | $O_{1i}$ | × | $W_{1i}$ | |
| RECEIVER | $O_{2i}$ | × | $W_{2i}$ | |
| SUBJECT | $O_{3i}$ | × | $W_{3i}$ | $S_i = \dfrac{\sum_{j=1}^{6} O_{ji} \times W_{ji}}{n_i}$ |
| Cc | $O_{4i}$ | × | $W_{4i}$ | |
| KEYWORDS | $O_{5i}$ | × | $W_{5i}$ | |
| LOCAL | $O_{6i}$ | × | $W_{6i}$ | |

OTHER PUBLICATIONS

ITU–T Recommendation X.411, "Information technology—Message Handling Systems (MHS): Message transfer system: Abstract service definition and procedures" (Nov. 1995).

ITU–T Recommendation X.413, "Information Technology—Message Handling Systems (MHS): Message Store: Abstract Service Definition" (Apr. 1995).

ITU–T Recommendation X.419, "Information Technology—Message Handling Systems (MHS): Protocol Specifications" (Nov. 1995).

ITU–T Recommendation X.420, "Information technology—Message Handling Systems (MHS): Interpersonal messaging system" (Oct. 1996).

Office Computing Report, vol. 15, No. 90, ISSN: 1057–8889, Sep. 1992, pp. 5–19.

P.H. Winston, *Artificail Intelligence*, $3^{rd}$ Ed. Addison Wesley, 1992, Chapter 21, "Learning by Building Identification Trees", pp. 423–431.-

Fig. 2

TRU

| 10 | 11 | 12 | 13 | 14 | 15 |

HEADER — BODY

Fig. 3

|  | OCCURENCE VALUE FOR GROUP 1 | WEIGHT FACTOR FOR GROUP 1 |
|---|---|---|
| AUTHOR | $O_{1i}$ × | $W_{1i}$ |
| RECEIVER | $O_{2i}$ × | $W_{2i}$ |
| SUBJECT | $O_{3i}$ × | $W_{3i}$ |
| Cc | $O_{4i}$ × | $W_{4i}$ |
| KEYWORDS | $O_{5i}$ × | $W_{5i}$ |
| LOCAL | $O_{6i}$ × | $W_{6i}$ |

$$S_i = \frac{\sum_{j=1}^{6} O_{ji} \times W_{ji}}{n_i}$$

THRESHOLD FOR SORTING ACTIVITY

| ACTIVE GROUP | TIME OF EXPIRATION |
|---|---|
| MEETING | 14 DAYS |

WEIGHTS

| FROM | TO | SUBJECT |
|---|---|---|
| 0.18426 | 0.1908 | 0.142 |
| C | KEYWORDS | LOCAL |
| 0.1906 | 0.1725 | 0.1027 |

OK   RESET   ADJUST

Fig. 6

TRANSMISSION UNIT RECEIVING AND STORING MEANS

[FIELD OF INVENTION]

The present invention relates to a receiving and storing means for receiving and storing transmission units containing information and to a corresponding method. Such a receiving and storing means is connected to a transmission means for such transmission units, to thereby form a communication system, the transmission units having a format such that besides other data, they also contain data relating to properties of each individual transmission unit.

[BACKGROUND OF INVENTION]

Electronic message systems that transmit so called electronic mails (e-mails) have become very important as a quick and efficient means of exchanging information. In such systems, one user can compose a message and send it to another user by specifying that user's address. This message is then translated into a format that is suitable for the transmission system to which both users are connected, and then routed through said transmission system to the addressee.

A well known system that supports such an electronic message system is the so called internet. Besides this global system, there also exist networks which are restricted to a given number of subscribers at a given location, e.g. a given number of users in one company, where such systems are referred to as intranets. It is also possible to combine local and global message transfer systems, e.g. by letting the user in an intranet send messages to other users in the intranet, or send out messages to subscribers of the global net through a so called gateway, i.e. a connection point between the intranet and the global network.

Figure 6:
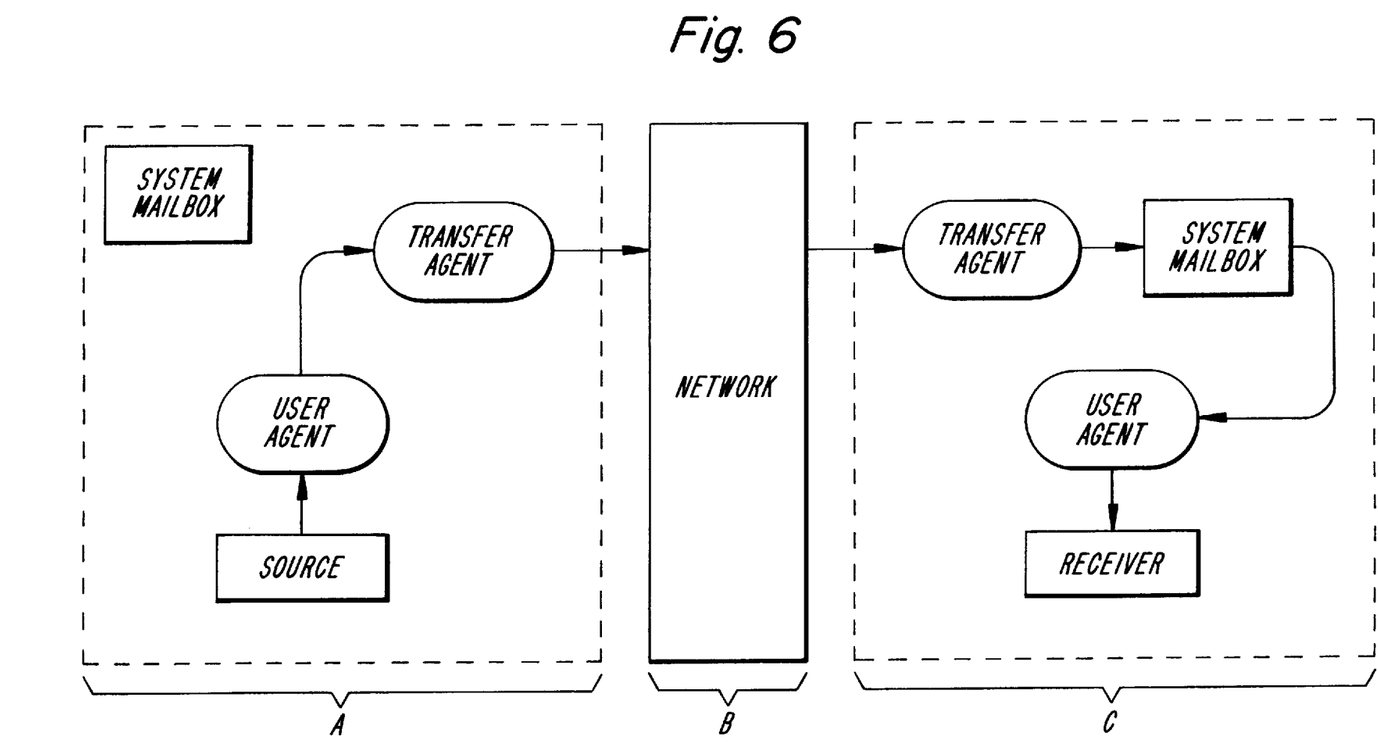
FIG. 6 shows a communication system which routs messages. from a source to a receiver via a network.

Such networks therefore allow communication between a message source and one or more message receivers. With respect to the communication between the source and the receiver, two questions need to be answered, namely what can be transferred and how can it be transferred. The first question refers to the syntax and the second to the protocol. In the presently used network communications systems described above, two major protocol standards have emerged, namely the so called Simple Mail Transfer Protocol (RFC 821) and the OSI Message Handling System (X.400 series). In order to perform the transferring of data, both of these protocols assign so called user agents as communication front ends for any given user. FIG. 6 schematically shows an example of a message handling system based on these protocols. A user agent will collect outgoing messages and incoming messages. In order to send a message, the user agent communicates with a transfer agent, which in turn handles the routing of the message through the network to the receiver's user agent. On the receiving side, the message is then routed to a so called mailbox by a transfer agent. The messages collected in the mailbox can then be called up by the receiver, via his user agent. The source or sending unit A, the network B and the receiving unit C form a communication system. As indicated by the identical structure shown in FIG. 6, both units A and C can send and receive messages.

The syntax of the transmission units or messages is generally divided into two parts, namely a header and a body. While the body carries the actual contents of the message, i.e. the information that the source desires to communicate to the receiver, the header contains the information relating to the message itself, e.g. the author's and receiver's address, as well as information concerning the time or date and the subject of the message. The body can consist of plain text or of binary encoded information representing any kind of computer data format. The transmission of several body parts that all belong to single message is also supported. A message that is divided in this way, is then reassembled at the receiver's end. For the two protocol standards mentioned above, the syntax is specified in RFC 822 and RFC 1521/RFC 1522 for RFC 821 and X.419 for OSI. This is disclosed in detail in the following documents, so that no description is given in the framework of this application.

Crocer, David H., RFC 822: Standard for the format of ARPA Internet text messages, DDN Networking Information Center, SRI International, August 1982. Borenstein N., Freed N.,RFC 1521: MIME(Multipurpose Internet Mail Extension)Part one: Mechanisms for specifying and describing the format of Internet message bodies, DDN Network Information Center, SRI International, September 1993. Moore K., RFC 1522: MIME(Multipurpose Internet Mail Extensions)Part two: Message header extensions for non-ASCII text, DDN Network Information Center, SRI International, September 1993. CCITT Study Group VII, Data Communication Networks: Message Handling Systems(MHS), volume VIII, Recommendations X.400–X.420 of the Red Book Series, International Telecommunication Union, 1984. CCITT Study Group VII, Data Communication Networks: Message Handling Systems (MHS), volume VIII, Recommendations X.400–X.420 of the Blue Book Series, International Telecommunication Union, 1989.

[PRIOR ART AND PROBLEM]

In message handling systems of the above described type, a user agent will store newly received messages in an appropriate storage means. As already mentioned, these newly received messages consist of data relating to the actual contents of the message and of data relating to the message itself, e.g. the author, the recipient, the subject, keywords etc. The messages are typically stored into a predetermined group, i.e. into a folder referred to as an in-box. In this folder, the messages can be sorted according to arbitrary criteria, e.g. in the order of their respective times of being received or sent, or they can be sorted according to authors, etc. . The user can then retrieve the messages from the in-box and go through them to decide which messages to keep, which messages to delete, and where to store messages that he desires to keep. Often these actions will be highly repetitive for recurring messages, e.g. a message relating to a specific subject (e.g. a project) may always be stored into a specific folder. This action of scanning newly received mails can be very tedious and time consuming, especially if a user receives a large volume of messages. It also constitutes a burden for the storage means, as stored messages need to be read and re-stored. Thereby, this method of receiving and storing electronic messages is technically inefficient.

To avoid this time consuming work and to achieve automation, systems have been proposed that allow a sorting of messages in accordance with rules that the user determines previously. Such a system is e.g. described in OFFICE COMPUTING REPORT, Vol.15, No.9, September 1992. Such systems are also referred to as a rule generators. The rules allow the system to automatically match specific mails in accordance with their properties. These rules typically have a when-if-then structure (when an event happens, and if the event meets certain conditions, then a specific action is taken). An example of this is: when a new message is delivered to the in-box that carries the subject "meeting", and if it is from the supervisor, then the message is stored in the meeting folder.

Such known systems have the disadvantage that the rules for allocating specific messages to specific groups (folders) must still be created by the user. This is not simple, because the user must be able to foresee which mails will arrive and how they are to be treated. This is especially difficult for users receiving a large amount of mail from various sources. Also, once a rule is determined, it remains unchanged and in time may no longer be suited to handle the changing situation relating to the properties of the received mails. As a consequence, the user must regularly check and update the applied rules. This again is a time consuming task that keeps the user from performing the actual work at hand, namely concentrating on the contents of the messages and responding accordingly. Otherwise, as it can not adapt, the system in time becomes inefficient.

The above problems, which are encountered when dealing with the handling of electronic mail messages, are not restricted to the specifically described systems. Much rather, such problems will always occur in systems that allocate received transmission units (e-mails in the above described example) into specific groups in a storage means.

Consequently, the object of the present invention consists in providing a system and a method for automatically allocating transmission units into given groups, where the allocation itself is automatically performed and can automatically adapt to changing conditions, so that a highly efficient receiving and storing system can be achieved.

[BRIEF DESCRIPTION OF INVENTION]

This object is solved by a system and method employing a weighted sum with respect to the determination of allocation decision parameters from the comparison between the structure of previously stored transmission units and the newly to be stored transmission units.

According to the invention, when receiving a new transmission unit (e.g. an e-mail) the system determines the data relating to a predetermined number of properties (e.g. author, receiver, and subject) of the received unit. This data or field value of a property field (e.g. the name of the author indicated in the author field of the message) is then compared with the corresponding data (e.g. the names of authors) in units previously stored in a predetermined number of groups (e.g. folders). It is determined how often the data related to each property of the newly received unit is contained in each of the groups under consideration (e.g. group 1: name of author of received message is given as author in 10 stored messages, name of receiver of received message is given as receiver in 52 stored messages, subject of received message is given as subject in 4 stored messages; group 2: name of author of received message is given as author in 17 stored messages, name of receiver of received message is given as receiver in 34 stored messages, subject of received message is given as subject in 0 stored messages; etc.). Thereby the system determines data occurrence values for each property and each group (in the above example: 10 for property "author" in group 1, 52 for property "receiver" in group 1, etc.).

The system then multiplies each data occurrence value with a weight factor that is associated with the property and group. In each group, the resulting products are summed over the properties and divided by the number of units in the given group, to thereby generate storage decision values associated with each group under consideration. The received unit is then allocated to any one of all the possible groups (e.g. one of the folders under consideration or into a default folder) on the basis of the storage decision values.

Due to basing the allocation decision on decision values that depend on the units already stored in the system, the present invention achieves a receiving and storing system that can all at once automatically store new units into groups, and automatically adapt the decision to the present state of the previously stored units. Due to this automatic adaptation, the system of the present invention is highly flexible and very efficient.

[DESCRIPTION OF FIGURES]

Further advantages and features of the invention can be better understood from the following detailed description of preferred embodiments of the invention, taken together with the accompanying figures, in which.

[DETAILED DESCRIPTION OF EMBODIMENTS]

In the following, the present invention shall be described by way of preferred embodiments.

Figure 1:
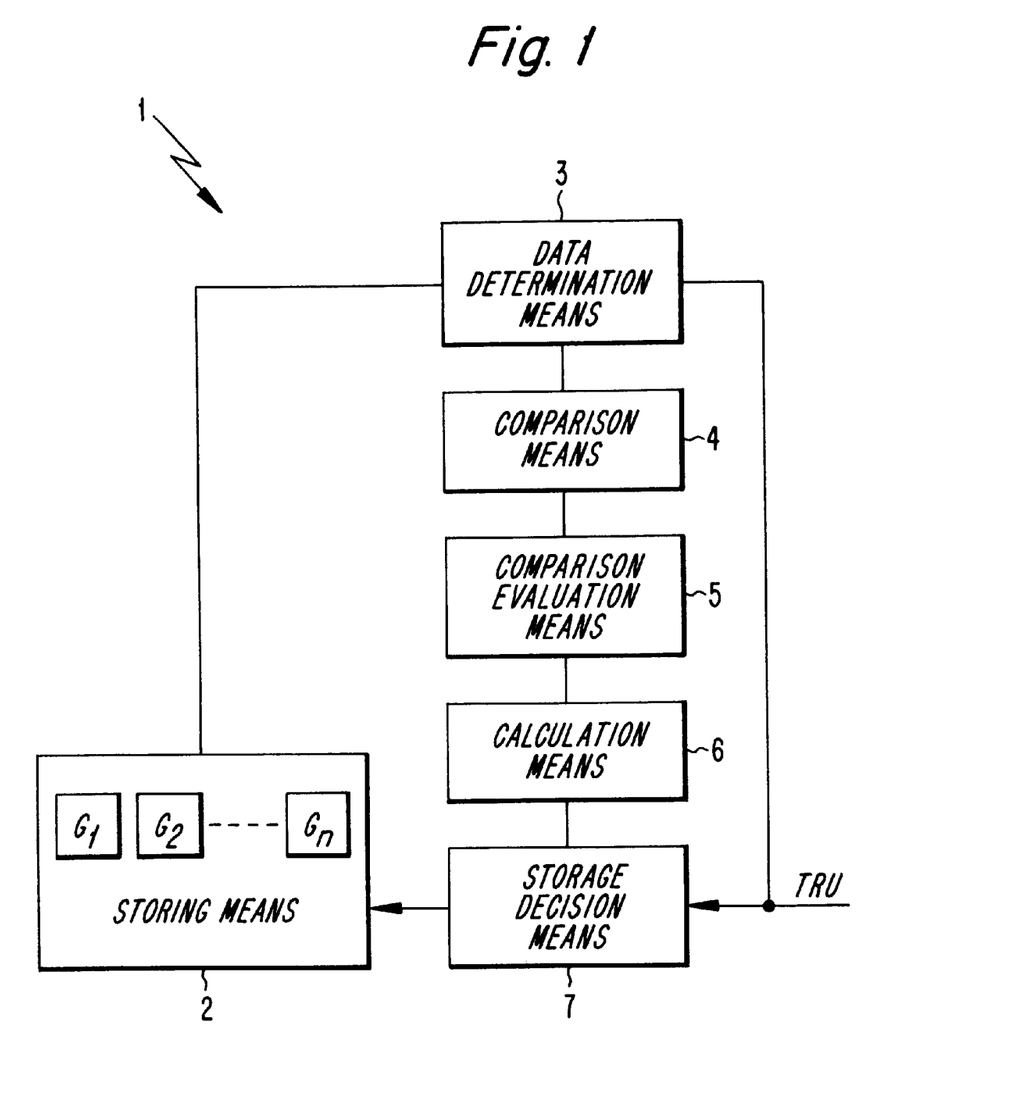
FIG. 1 shows a general embodiment of the present invention.

FIG. 1 shows a schematic outline of a general embodiment of the present invention. The receiving and storing means 1 consists of a storing means 2, in which transmission units TRU are stored into predetermined groups $G_1, \ldots, G_i, \ldots, G_n$. Furthermore, a data determination means 3 is provided, which determines the data relating to specific properties of a received transmission unit, and the corresponding data associated with the same specific properties in transmission units already stored in the storage means 2.

Figure 2:
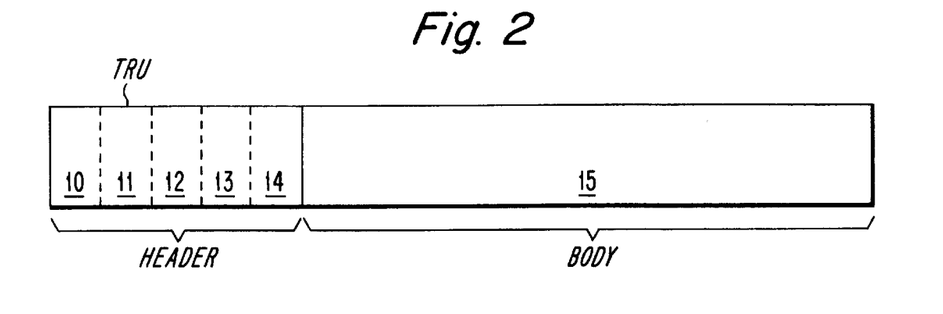
FIG. 2 shows an example of the format of transmission units in accordance with the present invention.

FIG. 2 shows an example of a transmission unit. The format of the shown transmission unit TRU is such that a header and a body are provided. The header consists of several sections or fields 10–14, each containing data related to a specific property of said unit TRU (e.g. author, receiver, date, etc.), i.e. field values. It should be noted that FIG. 2 only shows an example. The specific format of the transmission units is of little importance to the present invention, as long as they contain data associated with defined properties, and the association between given data and a specific property can be discerned. In the format shown in FIG. 2, this is assured by having specific sections in a determined order, where each section contains the data relating to a specific property. For example, section 10 can always contain the name of the author, section 11 the name of the receiver, etc. It is however equally well possible that the data relating to a specific property, i.e. the field value is identifiable by begin and end markers, so that this data can be located anywhere in the transmission unit.

The system shown in FIG. 1 furthermore comprises a comparison means 4, which compares the data from the incoming transmission unit with the data from the transmission units that are already stored. A comparison evaluation means 5 counts the number of times that a given information (e.g. a name) relating to one of a selected number of properties (e.g. author) of the incoming unit is contained in the property sections associated with said one property in the units stored in a certain number of groups, i.e. an occurrence value is determined. Said counting is performed for each of the selected number of properties and for each of the certain number of groups.

Figure 3:
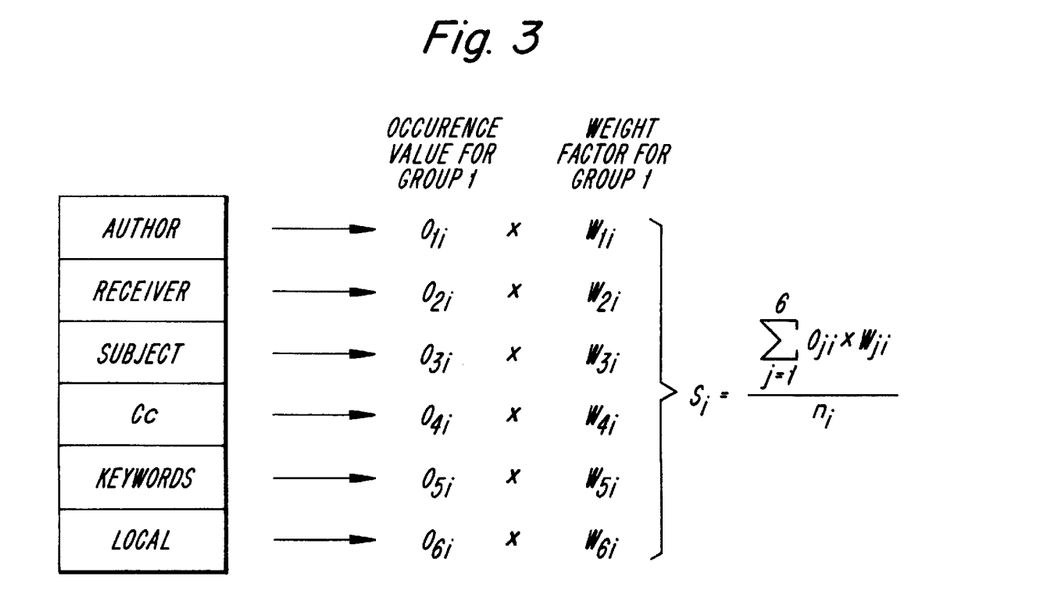
FIG. 3 schematically shows how a weighted sum is calculated for a given group.

A calculation means 6 is provided for using the values counted by said comparison evaluation means, as a basis for calculating a weighted sum for each of said certain number of groups. Said weighted sum is calculated from the products of said occurrence values with multiplication or weight factors, each weight factor also depending on said property and said group, just as said occurrence value. An example of this is shown in FIG. 3, where the selected properties are "author", "receiver", "subject", "Cc", "keywords" and "local" (this example will be discussed in more detail later). For example, the data contained in the property section associated with "author" in the received transmission unit (e.g. "Miller") is contained $O_{1i}$ times in the property sections associated with "author" in the units stored in group i. This value is then multiplied with the weight factor $W_{1i}$ and added to the sum of other products consisting of the occurrence value $O_{ji}$ and the weight factor $W_{ji}$ that depend on the property j and the group i. This sum $$\sum_{j=1}^{6} O_{ji} \cdot W_{ji}$$

is then divided by the number $n_i$ of units contained in the group i. The resulting value $S_i$ is a measure of how much the received transmission unit and the group under consideration have in common. The larger this value, the more the new transmission unit and the units in the considered group have in common.

Finally, a storage decision means 7 controls the storing or sorting of the newly received transmission unit on the basis of the decision values $S_i$ for the groups under consideration. As already mentioned, these decision values $S_i$ give a measure of how strongly the data of the considered properties of the received unit match the corresponding data in units stored in group i.

Figure 4:
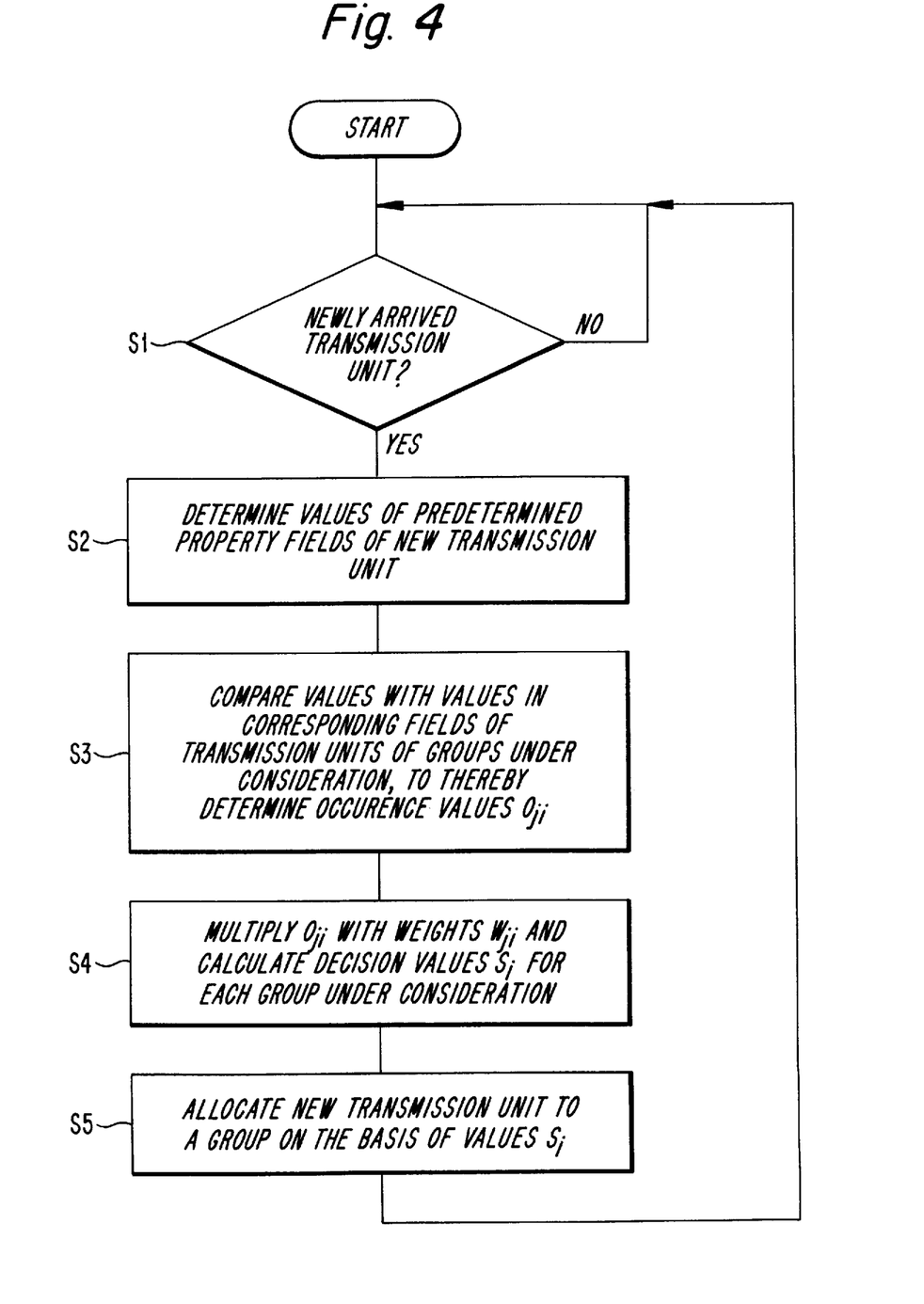
FIG. 4 shows a flow chart of the method according to an embodiment of the present invention.

FIG. 4 shows a flow chart of the method in accordance with the present invention, said method being employed by the system described above. In a first step S1 it is determined if a new transmission unit has arrived. If yes, then the values contained in the predetermined property fields of said new unit are determined in step S2, and compared with the values contained in the corresponding property fields of transmission units stored in the groups under consideration in step S3. Thus, occurrence values $O_{ji}$ for the occurrence of the value of the j-th property of the new unit in the i-th group are determined. Then, in step S4, these occurrence values are multiplied with weights $W_{ji}$ and the sum $$\sum_{j=1}^{P} O_{ji} \cdot W_{ji}$$

is calculated, where P represents the number of preselected properties. This sum is then divided by the number $n_i$ of units contained in the group i, to thereby determine the decision values $S_i$ for each group under consideration.

Finally, in step S5, the new transmission unit is automatically allocated to a group on the basis of the decision values $S_i$.

Due to this arrangement, the present invention provides a receiving and storing means for transmission units that can not only automatically allocate newly received units into groups, but which also automatically adapts its automatic allocation by performing the allocation on the basis of weighted sums that are calculated on the basis of the units contained in the groups under consideration. Therefore, the allocation decision is always automatically adapted to the momentary state of the considered groups. This makes the system very flexible and very efficient.

There is a variety of possibilities for using the decision values $S_i$ for allocating a received transmission unit to a group. According to one embodiment, the decision values $S_i$ are simply compared with one another, and the received message is then allocated to the group i that has the largest decision value $S_i$. In this way, the received transmission unit is allocated to the group with which it statistically has the most in common. According to another embodiment, the largest and second largest decision value are determined, and the received transmission unit is stored in only the group associated with the largest value if the difference between the largest value and the second largest value exceeds a certain limit, and is stored in both the group associated with the largest value and the group associated with the second largest value in the event that the difference is smaller than said limit. This embodiment modifies the previous embodiment to thereby provide a system that allows the allocation into two (or more) groups if their respective decision values are close together.

According to a preferred embodiment, the allocation decision is performed in accordance with the following method. First the largest of the decision values $S_i$ is determined, and then this value is compared with a threshold value T. If this largest value is larger than the threshold T, then the received transmission unit is stored into the group to which said largest decision value belongs. If not, then the received transmission unit is allocated to a predetermined default group, where said default group does not belong to the groups under consideration, i.e. no decision value $S_i$ is calculated for this default group.

The threshold T fulfills a double purpose. On the one hand it serves to prevent arbitrary decisions in the event that all decision values are relatively small, i.e. that the data in the property sections of the received transmission unit has little in common with any of the groups under consideration. On the other hand it serves as an adjustment parameter for adjusting how the frequently the automatic allocation function will be used. Consequently, it is preferable that T is a parameter that the user can set. If T is set to a relatively large value, then most received transmission units will be allocated to the default group, i.e. the frequency of automatic allocation to a group under consideration will be low. If T is set to a relatively low value, then the opposite effect occurs, i.e. an automatic allocation is performed often. The employment of the threshold T therefore provides great flexibility to the system.

Naturally, the decision method of storing the received transmission unit in two groups if the corresponding decision values $S_i$ are close together can be combined with the above embodiment using the threshold value T, i.e. a received transmission unit is stored in two groups if the decision values belonging to those two groups are close together and both exceed the value T.

As explained above, the present invention employs a number of parameters when determining the decision values $S_i$. First there is the number of properties under consideration (e.g. "author" and "receiver"=2; or "author", "receiver" and "subject"=3). Then there is the number of groups under consideration (e.g. 4 of 10 possible groups). Preferably, both of these parameters can be adjusted by the user, so that the user can customize the system to his personal needs and tastes. In other words, the user can adjust beforehand (i.e. before enabling the automatic allocation process) which properties of the transmission units are to be taken into consideration, and into which groups should it be possible to conduct automatic allocation.

Furthermore, the system of the invention uses the above mentioned weight factors $W_{ji}$. In one embodiment, these weight factors can be permanent values, but preferably these factors are again user adjustable parameters (i.e. the user can adjust these parameters prior to enabling the automatic allocation process) or are also automatically adapted to the momentary state of the groups under consideration. This latter feature will now be described.

In accordance with a preferred embodiment of the invention, the weight factors Wji used for calculating the above described weighted sum are determined on the basis of the average disorder regarding the occurrence of data associated with the properties under consideration. The average disorder of elements contained in a plurality of branches is generally defined as (see Winston, Patrick Henry, Artificial Intelligence, 3rd edition, Addison Wesley, 1992):

$$d_{avg} = \sum_b \left(\frac{n_b}{n_t}\right) \cdot \left(\sum_c -\frac{n_{bc}}{n_b} \log_2 \frac{n_{bc}}{n_b}\right),$$

where $n_b$ is the number of elements in branch b, $n_t$ is the total number of elements in all branches, and $n_{bc}$ is the number of elements in branch b of class c. The value 1 represents total disorder, while the value 0 represents total order. The concept of disorder for statistical distributions is associated with the concept of information entropy for probability distributions.

In accordance with the present invention, this general equation is applied to the system at hand by calculating the weight factor $W_{ji}$ for the j-th property of the considered properties and the i-th group under consideration by considering all transmission units in group i as one class and the units in the other groups under consideration as a second class. In other words, in the context of the present invention, there only exist two classes.

First, it must be determined how many different values exist for the j-th property. As an example, if the j-th property is the property "author", then it must be determined how many different names (these are the values) are to be found in this category in the transmission units stored in all of the groups under consideration. Let us assume that 20 names occur, which will be denoted by the subscript k, i.e. $name_1, \ldots, name_k, \ldots, name_{20}$. The number of times that $name_k$ (which belongs to property j) occurs in group i is denoted as $Q_{ji}(name_k)$, whereas the number of times that $name_k$ occurs in the other groups under consideration is denoted as $NQ_{ji}(name_k)$. The total number of units (in all groups under consideration) in which $name_k$ occurs, is denoted as $T_{ji}(name_k)$, where naturally $T_{ji}(name_k)=Q_{ji}(name_k)+NQ_{ji}(name_k)$. The total number of units contained in all of the groups under consideration is denoted as N. In the given example, i.e. with 20 different names, N is given by the following equation $$N = \sum_{k=1}^{20} T_{ji}(name_k).$$

Consequently, the disorder dji of the j-th property ("author" in this example) with respect to the i-th group is given as:

$$d_{ji} = \sum_{k=1}^{20} \frac{T_{ji}(name_k)}{N}\left(-\frac{Q_{ji}(name_k)}{T_{ji}(name_k)} \cdot \log_2\left(\frac{Q_{ji}(name_k)}{T_{ji}(name_k)}\right) - \frac{NQ_{ji}(name_k)}{T_{ji}(name_k)} \cdot \log_2\left(\frac{NQ_{ji}(name_k)}{T_{ji}(name_k)}\right)\right)$$

Therefore, if the j-th property in general has $K_j$ different values, where said values are the contents of the j-th property fields of the stored units and are referred to as $value_k$, then the disorder $d_{ji}$ is generally determined by $$d_{ji} = \sum_{k=1}^{K_j} \frac{T_{ji}(value_k)}{N}\left(-\frac{Q_{ji}(value_k)}{T_{ji}(value_k)} \cdot \log_2\left(\frac{Q_{ji}(value_k)}{T_{ji}(value_k)}\right) - \frac{NQ_{ji}(value_k)}{T_{ji}(value_k)} \cdot \log_2\left(\frac{NQ_{ji}(value_k)}{T_{ji}(value_k)}\right)\right)$$

The terms $Q_{ji}/T_{ji}$ represent the relative occurrence of $value_k$ in group i. If one of the numbers $Q_{ji}(value_k)$ or $NQ_{ji}(value_k)$ equals 0, which means that all units containing $value_k$ are in group i or that no unit with $value_k$ is contained in group i, then the corresponding product $$\frac{Q_{ji}(value_k)}{T_{ji}(value_k)} \cdot \log_2\left(\frac{Q_{ji}(value_k)}{T_{ji}(value_k)}\right) \text{ or } \frac{NQ_{ji}(value_k)}{T_{ji}(value_k)} \cdot \log_2\left(\frac{NQ_{ji}(value_k)}{T_{ji}(value_k)}\right)$$

is defined as 0, because the limit value lim(x logx) for x->0 is equal to 0. In this way, all possible values in the equation determining $d_{ji}$ are defined.

According to the present invention, the weights $W_{ji}$ are defined by the equation $$W_{ji} = \frac{1-d_{ji}}{\sum_{J=1}^{P}(1-d_{Ji})}.$$

The sum in the denominator runs over all of the selected properties (referred to as J to thereby avoid confusion with respect to the value $d_{ji}$ in the numerator), i.e. from 1 to P, where P is the number of selected properties. Consequently, the weights $W_{ji}$ reflect the average disorder associated with values of the j-th property with respect to the i-th group. For example, if there is a large degree of order with respect to a given group i, i.e. most of the values associated with property j are identical in said group, then the disorder $d_{ji}$ is low and the weight factor $W_{ji}$ is large. Consequently, the j-th property becomes prominent in the determination of the decision value $S_i$ of the i-th group. On the other hand, if there is a large degree of disorder with respect to the j-th property (i.e. $d_{ji}$ large), then the influence of the j-th property on the decision value $S_i$ is smaller.

Due to this preferred embodiment, the system becomes more flexible and more efficient, because not only are the parameters for performing the allocation determined automatically on the basis of the momentary situation in the groups under consideration, but the parameters for calculating the decision parameters are also automatically adapted to the momentary situation in the groups under consideration.

According to a further preferred embodiment, the system is arranged such that a time of expiration function is included. This function causes the system to automatically delete stored transmission units once the value in the field associated with the time or date property indicates that they have been stored for a predetermined amount of time. Preferably, this predetermined time is different for each individual group, and can be set by the user prior to enabling the system. At regular intervals, e.g. once a day, the system then checks the value in the date field of each stored transmission unit, determines the difference to the momentary date, and deletes the unit if this difference exceeds the expiration value set for the group in which the unit is stored. For example, if the user has set an expiration time of one week for a given group, then the system will delete those transmission units in the group who are older than one week with respect to the momentary date.

This feature ensures that the number of stored transmission units can automatically be regulated and the system does not become overburdened with excessive amounts of stored units. Especially, this feature enhances the basic mechanism of the present invention, because it ensures that the allocation, which is determined by the momentary state of the system, is indeed adapted to the latest message streams. In other words, older messages, which are automatically deleted by the time of expiration feature, no longer influence the allocation of new messages, so that the system will more rapidly adapt to the characteristics of the current message streams. Consequently, this feature improves the automatic flexibility of the system.

Figure 5:
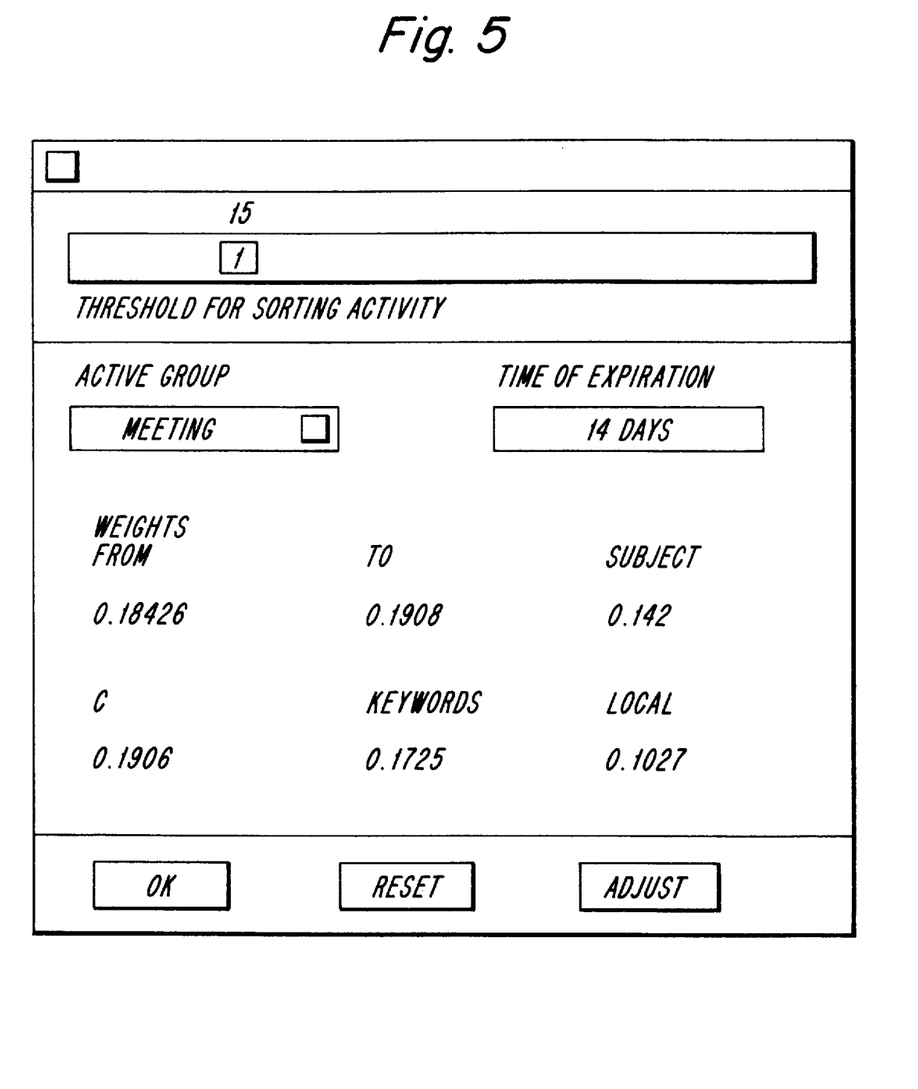
FIG. 5 shows an example of a graphical user interface for allowing a user to adjust parameters used in an embodiment of the present invention.

As already mentioned above, the user can preferably adjust several parameters of the system prior to enabling the automatic allocation system. According to another preferred embodiment, this adjusting or setting of parameters is accomplished with the help of a so called graphical user interface, an example of which is shown in FIG. 5. Such a graphical user interface can e.g. be displayed on a display means such as a CRT, and the adjustment can be performed with the help of standard input devices, such as a mouse and a keyboard. Such display means and input means are well known in the art, so that no description needs to be given here.

In the figure, it is possible to adjust the threshold value T for determining the automatic sorting activity, the group for which parameters are to be adjusted can be selected, and a time of expiration can be set. Furthermore, the weights associated with the predetermined number of properties for the selected group are displayed.

This feature greatly enhances the usability of the system, as a user can quickly and safely configure the system to his personal needs and tastes.

A best mode for employing the invention consists in a software implemented system for handling electronic mails or e-mails. This best mode embodiment will now be described. This system is installed on the computer of a user who is suitably connected to a transmission network, e.g. to the internet by a commercial provider. The system comprises a graphic user interface as described above, of which an example is shown in FIG. 5. Before activating the system, the user must create a desired number of folders into which new e-mails are to be automatically allocated by the system. In accordance with this best mode, the system will use all of these folders as the above mentioned groups under consideration and will automatically create a default folder (e.g. entitled "general in-box").

When receiving a new e-mail, the system extracts the values from a predetermined number (previously adjusted by the user with the help of the graphical user interface) of property fields in the message, compares them with the values in the corresponding property fields of the messages stored in the folders under consideration (in this case all of the folders except the default folder), determines the corresponding occurrence values $O_{ji}$ and then determines the decision values $S_i$ for each of the folders under consideration as described above in connection with FIG. 3. The weights Wji are automatically determined on the basis of the disorder dji, i.e. by $$W_{ji} = \frac{1 - d_{ji}}{\sum_{J=1}^{P} (1 - d_{Ji})},$$

as explained in detail above.

The system then determines the maximum decision value $S_{max}$ and compares this value with a user defined threshold T. This threshold T is determined beforehand by the user, with the help of the graphical user interface, as e.g. shown in FIG. 5. If $S_{max}$ larger than T, then the e-mail is allocated to the folder to which $S_{max}$ belongs. If not, the e-mail is allocated to the default folder.

The best mode embodiment furthermore comprises the above mentioned time of expiration feature, where the expiration time can be individually adjusted for each folder, as also indicated in FIG. 5. The feature functions as described above.

This embodiment constitutes one possibility of combining the features from the above described preferred embodiments with the initially described general embodiment of the invention, it should however be noted that these individual features contained in the various preferred embodiments can be combined in any desirable way with the initially described general embodiment, in accordance with the specific requirements and individual preferences that a person skilled in the art may have when putting the present invention to practice.

The above described embodiments are to be seen as examples of the present invention. The invention is however by no means restricted to these examples, as variations and modifications will readily occur to those skilled in the art. Much rather, the present invention is defined by the scope of the appended claims. Reference signs in the claims do not restrict the scope and only serve the purpose of better understanding.

What is claimed is:

1. A receiving and storing means (1) for transmission units (TRU) containing information, each transmission unit having a format such that it contains a plurality of unit property fields (10–14) that each contain a value associated with a property of said transmission unit, comprising:
   storage means (2) for storing transmission units, said storage means being arranged such that any transmission unit stored therein is allocated to one or more of a plurality of predetermined groups ($G_1, G_2, \ldots, G_n$; i),
   data determination means (3) arranged such that
      the respective values in a predetermined number of unit property fields of a transmission unit received by said receiving means are determined, and,
      for certain groups of said storage means, corresponding values in the same predetermined number of unit property fields of all transmission units in said certain groups are determined, comparison means (4) for comparing said values from said received transmission unit with the values from said transmission units contained in said certain groups, comparison evaluation means (5) arranged such that, for each of said certain groups, the number of times ($O_{ji}$) is counted that a value from a specific unit property field (j) of said received transmission unit occurs in the same specific unit property field (j) of transmission units stored in said group (i), to thereby determine a value occurrence value ($O_{ji}$) for said same specific unit property field (j) of said group (i), calculation means (6) arranged such that each value occurrence value ($O_{ji}$) for a given unit property field (j) and given group (i) is multiplied with a multiplication factor ($W_{ji}$) that depends on said given unit property field (j) and said given group (i), to thereby calculate a number of group product values that are equal in number to said predetermined number of unit property fields, and, for each of said certain groups, said group product values are added together to a sum, said sum being divided by the number ($n_i$) of transmission units in said group (i), to thereby generate a storage decision value ($S_i$) for each of said certain groups, and storage decision means (7) for deciding in which of all groups of said storage means to store said received transmission unit, on the basis of said storage decision values ($S_i$) of said certain groups.

2. A receiving and storing means according to claim 1, wherein storage decision means (7) are arranged such that the storage decision values ($S_i$) are compared and the largest value is determined, said received transmission unit being stored in the group associated with said largest value.

3. A receiving and storing means according to claim 2, wherein said storage decision means (7) are arranged such that also the second largest of said storage decision values ($S_i$) is determined, the difference between said largest and said second largest value is determined, and if said difference is smaller than a predetermined limit, said received transmission unit is also stored in the group associated with said second largest storage decision value ($S_i$).

4. A receiving and storing means according to claim 1, wherein said storage decision means (7) is arranged such that the storage decision values ($S_i$) are compared and the largest value is determined, said largest value being compared to a threshold value (T) that depends on the group associated with said largest value, wherein said received transmission unit is stored in said group associated with said largest value if said largest value exceeds said threshold value, and otherwise in a different, predetermined group.

5. A receiving and storing means according to claim 4, wherein said storage decision means (7) is arranged such that also the second largest of said storage decision values ($S_i$) is determined, the difference between said largest and said second largest value is determined, and if said difference is smaller than a predetermined limit and said second largest value also exceeds said threshold value (T), said received transmission unit is also stored in the group associated with said second largest storage decision value ($S_i$).

6. A receiving and storing means according to claim 1, wherein said calculation means (7) is arranged to automatically calculate each multiplication factor ($W_{ji}$) for the associated property field (j) and group (i) on the basis of the disorder ($d_{ji}$) of the values from said associated property field (j) with respect to the transmission units stored in said group (i) in comparison to the transmission units stored in the other groups of said certain groups.

7. A receiving and storing means according to claim 6, wherein said data determination means (3) is arranged to determine, for each of said predetermined number (P) of property fields, the number $K_j$ of different values $value_k$ contained in the respective property fields of the transmission units stored in said certain groups, said different values $value_k$, the number of times $Q_{ji}(value_k)$ that each of said values $value_k$ of each of said property fields (j) occurs in a given one (i) of said certain groups, the number of times $NQ_{ji}(value_k)$ that each of said values $value_k$ of each of said property fields (j) occurs in the other groups of said certain groups besides said one given group, the total number $T_{ji}$ of times that one of said values $value_k$ occurs in the transmission units stored in all of said certain groups, and the total number N of transmission units stored in all of said certain groups, said calculating means is arranged to calculate said disorder $d_{ji}$ through the following equation:

$$d_{ji} = \sum_{k=1}^{K_j} \frac{T_{ji}(value_k)}{N}\left(-\frac{Q_{ji}(value_k)}{T_{ji}(value_k)} \cdot \log_2\left(\frac{Q_{ji}(value_k)}{T_{ji}(value_k)}\right) - \frac{NQ_{ji}(value_k)}{T_{ji}(value_k)} \cdot \log_2\left(\frac{NQ_{ji}(value_k)}{T_{ji}(value_k)}\right)\right)$$

where the term $$\frac{Q_{ji}(value_k)}{T_{ji}(value_k)} \cdot \log_2\left(\frac{Q_{ji}(value_k)}{T_{ji}(value_k)}\right)$$

is set equal to zero if the value $Q_{ji}(value_k)$ is equal to zero, and the term $$\frac{NQ_{ji}(value_k)}{T_{ji}(value_k)} \cdot \log_2\left(\frac{NQ_{ji}(value_k)}{T_{ji}(value_k)}\right)$$

is set equal to zero if the value $NQ_{ji}(value_k)$ is equal to zero, and said calculation means is arranged to calculate said multiplication factor $W_{ji}$ associated with each of said property fields (j) and each of said groups (i) through the following equation $$W_{ji} = \frac{1 - d_{ji}}{\sum_{J=1}^{P}(1 - d_{Ji})},$$

where P is the number of predetermined property fields.

8. A receiving and storing means according to claim 1, wherein a display means and a control means for said display means are provided, and said display means is arranged to display a graphical user interface for entering parameters.

9. A receiving and storing means according to claim 1, wherein a means is provided, which is arranged to regularly determine a characteristic date for each of said transmission units stored in said certain groups, compare said characteristic date with the current date, and delete said transmission unit if the difference between said characteristic date and the current date exceeds a predetermined time limit.

10. A communication system comprising:
   a receiving and storing means according to claim 1, and
   a transmission means connected to said receiving and storing means, for transmitting transmission units.

11. A communication system according to claim 10, wherein said transmission means is a data network for carrying electronic mail messages, and said transmission units are electronic mail messages.

12. A method for receiving and storing transmission units (TRU) containing information, each transmission unit having a format such that it contains a plurality of unit property fields (10–14) that each contain a value associated with a property of said transmission unit, said transmission units being stored in a storage means, where said storage means is arranged such that any transmission unit stored therein is allocated to one or more of a plurality of predetermined groups ($G_1, G_2, \ldots, G_n$; i), comprising the steps of:
   determining the respective values in a predetermined number of unit property fields of a received transmission unit, and,
   for certain groups of said storage means, determining corresponding values in the same predetermined number of unit property fields of all transmission units in said certain groups,
   comparing said values from said received transmission unit with the values from said transmission units contained in said certain groups,
   counting, for each of said certain groups, the number of times ($O_{ji}$) that a value from a specific unit property field (j) of said received transmission unit occurs in the same specific unit property field (j) of transmission units stored in said group (i), to thereby determine a value occurrence value ($O_{ji}$) for said same specific unit property field (j) of said group (i),
   multiplying each value occurrence value ($O_{ji}$) for a given unit property field (j) and given group (i) with a multiplication factor ($W_{ji}$) that depends on said given unit property field (j) and said given group (i), to thereby calculate a number of group product values that are equal in number to said predetermined number of unit property fields, and,
   adding, for each of said certain groups, said group product values together to a sum, said sum being divided by the number ($n_i$) of transmission units in said group (i), to thereby generate a storage decision value ($S_i$) for each of said certain groups, and
   deciding in which of all groups of said storage means to store said received transmission unit, on the basis of said storage decision values ($S_i$) of said certain groups.

13. A method according to claim 12, wherein the storage decision values ($S_i$) are compared and the largest value is determined, said received transmission unit being stored in the group associated with said largest value.

14. A method according to claim 13, wherein also the second largest of said storage decision values ($S_i$) is determined, the difference between said largest and said second largest value is determined, and if said difference is smaller than a predetermined limit, said received transmission unit is also stored in the group associated with said second largest storage decision value ($S_i$).

15. A method according to claim 12, wherein the storage decision values ($S_i$) are compared and the largest value is determined, said largest value being compared to a threshold value (T) that depends on the group associated with said largest value, wherein said received transmission unit is stored in said group associated with said largest value if said largest value exceeds said threshold value, and otherwise in a different, predetermined group.

16. A method according to claim 15, wherein also the second largest of said storage decision values ($S_i$) is determined, the difference between said largest and said second largest value is determined, and if said difference is smaller than a predetermined limit and said second largest value also exceeds said threshold value (T), said received transmission unit is also stored in the group associated with said second largest storage decision value ($S_i$).

17. A method according to claim 12, wherein each multiplication factor ($W_{ji}$) for the associated property field (j) and group (i) is calculated on the basis of the disorder ($d_{ji}$) of the values from said associated property field (j) with respect to the transmission units stored in said group (i) in comparison to the transmission units stored in the other groups of said certain groups.

18. A method according to claim 17, comprising the steps:
   determining, for each of said predetermined number (P) of property fields, the number $K_j$ of different values $value_k$ contained in the respective property fields of the transmission units stored in said certain groups, said different values $value_k$, the number of times $Q_{ji}(value_k)$ that each of said values $value_k$ of each of said property fields (j) occurs in a given one (i) of said certain groups, the number of times $NQ_{ji}(value_k)$ that each of said values $value_k$ of each of said property fields (j) occurs in the other groups of said certain groups besides said one given group, the total number $T_{ji}$ of times that one of said values $value_k$ occurs in the transmission units stored in all of said certain groups, and the total number N of transmission units stored in all of said certain groups,
   calculating said disorder $d_{ji}$ through the following equation:

$$d_{ji} = \sum_{k=1}^{K_j} \frac{T_{ji}(value_k)}{N} \left( -\frac{Q_{ji}(value_k)}{T_{ji}(value_k)} \cdot \log_2\left(\frac{Q_{ji}(value_k)}{T_{ji}(value_k)}\right) - \frac{NQ_{ji}(value_k)}{T_{ji}(value_k)} \cdot \log_2\left(\frac{NQ_{ji}(value_k)}{T_{ji}(value_k)}\right) \right)$$

where the term $$\frac{Q_{ji}(value_k)}{T_{ji}(value_k)} \cdot \log_2\left(\frac{Q_{ji}(value_k)}{T_{ji}(value_k)}\right)$$

is set equal to zero if the value $Q_{ji}(value_k)$ is equal to zero, and the term $$\frac{NQ_{ji}(value_k)}{T_{ji}(value_k)} \cdot \log_2\left(\frac{NQ_{ji}(value_k)}{T_{ji}(value_k)}\right)$$

is set equal to zero if the value $NQ_{ji}(value_k)$ is equal to zero, and calculating said multiplication factor $W_{ji}$ associated with each of said property fields (j) and each of said groups (i) through the following equation $$W_{ji} = \frac{1 - d_{ji}}{\sum_{J=1}^{P} (1 - d_{Ji})},$$

where P is the number of predetermined property fields.

19. A method according to claim 12, wherein a graphical user interface is provided for entering parameters being displayed on a display means.

20. A method according to claim 12, comprising the steps of regularly determining a characteristic date for each of said transmission units stored in said certain groups, comparing said characteristic date with the current date, and deleting said transmission unit if the difference between said characteristic date and the current date exceeds a predetermined time limit.

21. A method according to claim 12, wherein said transmission units are electronic mail messages which are transmitted over a data network for carrying electronic mail messages.

22. Computer program for the receipt and storage of transmission units (TRU) containing information, each transmission unit having a format such that it contains a plurality of unit property fields (10–14) that each contain a value associated with a property of said transmission unit, said computer program being designed to store said transmission units in a storage means, where said computer program is designed such that any transmission unit stored stored in said storage means is allocated to one or more of a plurality of predetermined groups ($G_1, G_2, \ldots, G_n$; i), said computer program implementing a method comprising the steps of:

determining the respective values in a predetermined number of unit property fields of a received transmission unit, and,     for certain groups of said storage means, determining corresponding values in the same predetermined number of unit property fields of all transmission units in said certain groups,     comparing said values from said received transmission unit with the values from said transmission units contained in said certain groups,     counting, for each of said certain groups, the number of times ($O_{ji}$) that a value from a specific unit property field (j) of said received transmission unit occurs in the same specific unit property field (j) of transmission units stored in said group (i), to thereby determine a value occurrence value ($O_{ji}$) for said same specific unit property field (j) of said group:,     multiplying each value occurrence value ($O_{ji}$) for a given unit property field (j) and given group (i) with a multiplication factor ($W_{ji}$) that depends on said given unit property field (j) and said given group (i), to thereby calculate a number of group product values that are equal in number to said predetermined number of unit property fields, and,     adding, for each of said certain groups, said group product values together to a sum, said sum being divided by the number ($n_i$) of transmission units in said group (i), to thereby generate a storage decision value ($S_i$) for each of said certain groups, and     deciding in which of all groups of said storage means to store said received transmission unit, on the basis of said storage decision values ($S_i$) of said certain groups.

23. Computer program for receiving and storing electronic messages, said electronic messages having a format such that they contain specific fields that contain information associated with a property of the electronic message, where said computer program is designed to store said electronic messages in a storage means, such that any electronic message being stored is allocated to one or more of a plurality of predetermined groups, said computer program being designed to implement a method on a computer running said computer program, where said method comprises the steps of:

determining predetermined information associated with a property of a received electronic message, and,     for certain groups, determining corresponding information associated with the same property for all electronic messages in said certain groups,     comparing said information from said received electronic message with the information from said electronic messages contained in said certain groups,     counting, for each of said certain groups, the number of times that an information associated with a specific property of said received electronic message appears in the electronic messages stored in said group, to thereby determine an occurrence value that indicates the occurrence of said information associated with a specific property for said group,     multiplying each occurrence value for a given property and given group with a multiplication factor that depends on said given property and said given group, to thereby calculate a number of group product values,     adding, for each of said certain groups, said group product values together to a sum, said sum being divided by the number of electronic messages in said group, to thereby generate a storage decision value for each of said certain groups, and     deciding in which of all groups of said storage means to store said received electronic message, on the basis of said storage decision values of said certain groups.

24. Computer program according to claim 23, wherein said electronic messages are electronic mails, and said groups are electronic folders for receiving said electronic mails.

25. Computer program for receiving and storing electronic messages, said electronic messages having a format such that they contain specific fields that contain information associated with a property of the electronic message, where said computer program is designed to store said electronic messages in a storage means, such that any electronic message being stored is allocated to one or more of a plurality of predetermined groups, said computer program being designed to implement a method on a computer running said computer program, where said method comprises the steps of:

determining predetermined information associated with a property of a received electronic message, and,     for certain groups, determining corresponding information associated with the same property for all electronic messages in said certain groups,     comparing said information from said received electronic message with the information from said electronic messages contained in said certain groups,     counting, for each of said certain groups, the number of times that an information associated with a specific property of said received electronic message appears in the electronic messages stored in said group, to thereby determine an occurrence value that indicates the occurrence of said information associated with a specific property for said group,     multiplying each occurrence value for a given property and given group with a multiplication factor that depends on said given property and said given group, to thereby calculate a number of group product values,     adding, for each of said certain groups, said group product values together to a sum, said sum being divided by the number of electronic messages in said group, to thereby generate a storage decision value for each of said certain groups, and deciding in which of all groups of said storage means to store said received electronic message, on the basis of said storage decision values of said certain groups, where the storage decision values are compared and the largest value is determined, said received electronic message being stored in the group associated with said largest value.

26. Computer program for receiving and storing electronic messages, said electronic messages having a format such that they contain specific fields that contain information associated with a property of the electronic message, where said computer program is designed to store said electronic messages in a storage means, such that any electronic message being stored is allocated to one or more of a plurality of predetermined groups, said computer program being designed to implement a method on a computer running said computer program, where said method comprises the steps of:

determining predetermined information associated with a property of a received electronic message, and, for certain groups, determining corresponding information associated with the same property for all electronic messages in said certain groups, comparing said information from said received electronic message with the information from said electronic messages contained in said certain groups, counting, for each of said certain groups, the number of times that an information associated with a specific property of said received electronic message appears in the electronic messages stored in said group, to thereby determine an occurrence value that indicates the occurrence of said information associated with a specific property for said group, multiplying each occurrence value for a given property and given group with a multiplication factor that depends on said given property and said given group, to thereby calculate a number of group product values, adding, for each of said certain groups, said group product values together to a sum, said sum being divided by the number of electronic messages in said group, to thereby generate a storage decision value for each of said certain groups, and deciding in which of all groups of said storage means to store said received electronic message, on the basis of said storage decision values of said certain groups, where the storage decision values are compared and the largest value is determined, said largest value being compared to a threshold value that depends on the group associated with said largest value, where said received electronic message is stored in said group associated with said largest value if said largest value exceeds said threshold value, and otherwise in a different, predetermined group.

* * * * *